(12) United States Patent
Zhao et al.

(10) Patent No.: US 12,368,563 B2
(45) Date of Patent: Jul. 22, 2025

(54) DATA TRANSMISSION METHOD AND RELATED DEVICES

(71) Applicant: GUANGDONG OPPO MOBILE TELECOMMUNICATIONS CORP., LTD., Guangdong (CN)

(72) Inventors: Zhenshan Zhao, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 337 days.

(21) Appl. No.: 17/810,945

(22) Filed: Jul. 6, 2022

(65) Prior Publication Data

US 2022/0337376 A1    Oct. 20, 2022

Related U.S. Application Data

(63) Continuation of application No. PCT/CN2020/072564, filed on Jan. 16, 2020.

(51) Int. Cl.
*H04L 5/00* (2006.01)
*H04W 72/1273* (2023.01)
(Continued)

(52) U.S. Cl.
CPC ....... *H04L 5/0055* (2013.01); *H04W 72/1273* (2013.01); *H04W 72/21* (2023.01); *H04W 72/23* (2023.01); *H04W 72/30* (2023.01)

(58) Field of Classification Search
CPC ... H04L 5/0055; H04L 5/0094; H04L 1/1896; H04L 1/1825; H04L 1/1854; H04L 1/189;
(Continued)

(56) References Cited

U.S. PATENT DOCUMENTS

| 2006/0209870 A1* | 9/2006 | Lee | ........................ H04W 4/06 370/432 |
| 2008/0049749 A1 | 2/2008 | Xiao et al. | |

(Continued)

FOREIGN PATENT DOCUMENTS

| CN | 108347309 | 7/2018 |
| CN | 108809532 | 11/2018 |

(Continued)

OTHER PUBLICATIONS

CNIPA, First Office Action for CN Application No. 202210641164.7, Jun. 16, 2023.

(Continued)

*Primary Examiner* — Kwang B Yao
*Assistant Examiner* — Syed M Bokhari
(74) *Attorney, Agent, or Firm* — Hodgson Russ LLP

(57) ABSTRACT

A data transmission method and related devices are provided. The method is applicable to a network device. The method includes the following. A physical downlink shared channel (PDSCH) is transmitted, and first configuration information is transmitted, where the PDSCH is used for carrying a first-type service, and the first configuration information is used for configuring a physical uplink control channel (PUCCH) resource. Uplink feedback information transmitted by a terminal device is received on the PUCCH resource, where the uplink feedback information indicates whether a service carried by the PDSCH is correctly received.

17 Claims, 5 Drawing Sheets

(51) Int. Cl.
*H04W 72/21* (2023.01)
*H04W 72/23* (2023.01)
*H04W 72/30* (2023.01)

(58) Field of Classification Search
CPC . H04W 72/1273; H04W 72/21; H04W 72/23; H04W 72/30; H04W 28/04
USPC .......................................................... 370/312
See application file for complete search history.

(56) References Cited

U.S. PATENT DOCUMENTS

| | | | |
|---|---|---|---|
| 2014/0071864 A1 | 3/2014 | Seo et al. | |
| 2014/0355493 A1* | 12/2014 | Niu | H04L 12/189 370/312 |
| 2018/0007520 A1 | 1/2018 | Gustafson et al. | |
| 2018/0115430 A1 | 4/2018 | Seo | |
| 2019/0007174 A1* | 1/2019 | Takeda | H04W 72/20 |
| 2019/0123923 A1* | 4/2019 | Belleschi | H04W 4/40 |
| 2019/0297635 A1 | 9/2019 | Wu et al. | |
| 2019/0327743 A1 | 10/2019 | Shi et al. | |
| 2019/0349145 A1 | 11/2019 | You | |
| 2021/0111835 A1* | 4/2021 | Khoshnevisan | H04L 5/0055 |
| 2021/0315002 A1* | 10/2021 | Nakamura | H04L 5/0082 |
| 2022/0368503 A1* | 11/2022 | Sun | H04L 1/1854 |

FOREIGN PATENT DOCUMENTS

| | | |
|---|---|---|
| CN | 109802749 | 5/2019 |
| CN | 110034861 | 7/2019 |
| CN | 110034892 | 7/2019 |
| CN | 110121910 | 8/2019 |
| CN | 110199495 | 9/2019 |
| CN | 110392993 | 10/2019 |
| CN | 110636549 | 12/2019 |
| WO | 2011009254 | 1/2011 |
| WO | 2018028497 | 2/2018 |
| WO | 2018137129 | 8/2018 |

OTHER PUBLICATIONS

CNIPA, Notification to Grant Patent Right of Invention for CN Application No. 202210641164.7, Aug. 10, 2023.
CMCC, "Downlink HARQ-ACK feedback timing," 3GPP TSG RAN WG1 Meeting #88bis, R1-1705106, Apr. 2017.
WIPO, International Search Report and Written Opinion for International Application No. PCT/CN2020/072564, Sep. 28, 2020.
EPO, Extended European Search Report for EP Application No. 20913397.4, Oct. 28, 2022.
EPO, Communication for EP Application No. 20913397.4, Mar. 22, 2023.

\* cited by examiner

DATA TRANSMISSION METHOD AND RELATED DEVICES

CROSS-REFERENCE TO RELATED APPLICATION(S)

This application is a continuation of International Application No. PCT/CN2020/072564, filed Jan. 16, 2020, the entire disclosure of which is incorporated herein by reference.

TECHNICAL FIELD

This disclosure relates to the field of communication technology, and specifically to a data transmission method and related devices.

BACKGROUND

Retransmission is an efficient way to solve problems of packet loss and packet errors during data transmission by a network device to a terminal device. However, retransmission functions are not supported by some types of services such as multimedia broadcast/multicast service (MBMS). Therefore, how to introduce an uplink feedback mechanism for these types of services and improve reliability in service transmission is a problem to be solved.

SUMMARY

In a first aspect, a data transmission method is provided in implementations of the disclosure. The method is applicable to a network device. The method includes the following. A physical downlink shared channel (PDSCH) is transmitted, where the PDSCH is used for carrying a first-type service. First configuration information is transmitted, and the first configuration information is used for configuring a physical uplink control channel (PUCCH) resource. Uplink feedback information transmitted by a terminal device is received on the PUCCH resource, where the uplink feedback information indicates whether a service carried by the PDSCH is correctly received.

In a second aspect, a data transmission method is provided in implementations of the disclosure. The method is applicable to a terminal device. The method includes the following. A PDSCH transmitted by a network device is received, where the PDSCH is used for carrying a first-type service. First configuration information transmitted by a network device is received, the first configuration information is used for configuring a PUCCH resource. Uplink feedback information is transmitted to the network device on the PUCCH resource, where the uplink feedback information indicates whether a service carried by the PDSCH is correctly received.

In a third aspect, a network device is provided in implementations of the disclosure. The network device includes a processor, a transceiver, and a memory storing computer programs. The computer programs are executed by the processor to cause the transceiver to: transmit a PDSCH where the PDSCH is used for carrying a first-type service, transmit first configuration information, the first configuration information is used for configuring a PUCCH resource; receive, on the PUCCH resource, uplink feedback information transmitted by a terminal device, where the uplink feedback information indicates whether a service carried by the PDSCH is correctly received.

In a fourth aspect, a terminal device is provided in implementations of the disclosure. The terminal device includes a processor, a transceiver, and a memory storing computer programs. The computer programs are executed by the processor to cause the transceiver to: receive a PDSCH transmitted by a network device, where the PDSCH is used for carrying a first-type service, receive first configuration information transmitted by a network device and the first configuration information is used for configuring a PUCCH resource; transmit uplink feedback information to the network device on the PUCCH resource, where the uplink feedback information indicates whether a service carried by the PDSCH is correctly received.

BRIEF DESCRIPTION OF THE DRAWINGS

In order to describe more clearly technical solutions of implementations of the disclosure, the following will give a brief introduction to the accompanying drawings used for describing the implementations. Apparently, the accompanying drawings described below are some implementations of the disclosure. Based on these drawings, those of ordinary skill in the art can also obtain other drawings without creative effort.

DETAILED DESCRIPTION

Terms used in the detailed description of the disclosure are merely intended for explaining implementations of the disclosure rather than limiting the disclosure. The terms "first", "second", "third", "fourth", and the like used in the specification, the claims, and the accompany drawings of the disclosure are used to distinguish different objects rather than describe a particular order. In addition, the terms "include", "comprise", and "have" as well as variations thereof are intended to cover non-exclusive inclusion.

Implementations of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a wireless local area networks (WLAN), a wireless fidelity (WiFi), a next-generation communication system, or other communication systems, etc.

Generally speaking, a conventional communication system supports a limited number of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, etc. Implementations of the disclosure can also be applied to these communication systems.

Optionally, a communication system in implementations of the disclosure may be applied to a carrier aggregation (CA) scenario, a dual connectivity (DC) scenario, or a standalone (SA) network deployment scenario.

There is no limitation on the type of spectrum in implementations of the disclosure. For example, implementations of the disclosure are applicable to a licensed spectrum, and also applicable to an unlicensed spectrum.

Figure 1:
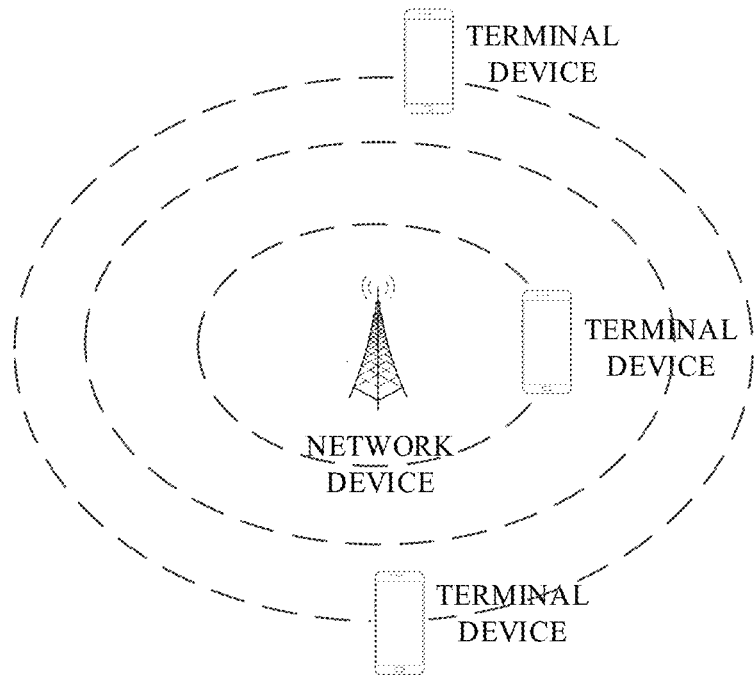
FIG. 1 is a schematic architectural diagram of a communication system provided in implementations of the disclosure.

Refer to FIG. 1, which is a schematic architectural diagram of a communication system provided in implementations of the disclosure. The communication system includes a network device and at least one terminal device. As illustrated in FIG. 1, the network device can communicate with the at least one terminal device. The communication system may be a $5^{th}$ generation (5G) communication system (such as new radio, NR), a communication system that integrates multiple communication technologies (such as communication system that integrates LTE technology and NR technology), or a future evolved communication system. The form and number of the network device and the terminal device illustrated in FIG. 1 are merely intended for illustration, and do not constitute limitation on implementations of the disclosure.

The terminal device in the disclosure is a device with wireless communication functions. The terminal device can be deployed on land, which includes indoor or outdoor, handheld, wearable, or in-vehicle. The terminal device can also be deployed on water (such as ships, etc.). The terminal device can also be deployed in the air (such as airplanes, balloons, satellites, etc.). The terminal device can be a mobile phone, a pad, a computer with wireless transceiver functions, a virtual reality (VR) terminal device, an augmented reality (AR) terminal device, a wireless terminal in industrial control, a wireless terminal in self driving, a wireless terminal in remote medicine, a wireless terminal in smart grid, a wireless terminal in smart home, etc. The terminal device may also be a handheld device with wireless communication functions, an in-vehicle device, a wearable device, a computing device, or other processing devices coupled with a wireless modem, etc. Terminal devices in different networks may be called different names, for example, terminal device, access terminal, subscriber unit, subscriber station, mobile station, remote station, remote terminal, mobile device, user terminal, terminal, wireless communication device, user agent or user device, cellular radio telephone, cordless telephone, session initiation protocol (SIP) telephone, wireless local loop (WLL) station, personal digital assistant (PDA), terminal device in 5G network or in future evolved network, etc.

The network device in the disclosure is a device that is deployed in a radio access network (RAN) to provide wireless communication functions. For example, the network device may be a RAN device at an access-network side in a cellular network. The RAN device is a device for access of the terminal device to a radio network, which includes but is not limited to: an evolved Node B (eNB), a radio network controller (RNC), a Node B (NB), a base station controller (BSC), a base transceiver station (BTS), a home base station (such as home evolved Node B, or home Node B (HNB)), a base band unit (BBU), and a mobility management entity (MME). For another example, the network device may also be a node device in a WLAN, such as access controller (AC), gateway, or WIFI access point (AP). For another example, the network device may also be a transmission node or transmission reception point (TRP or TP) in an NR system, etc.

Figure 2A:
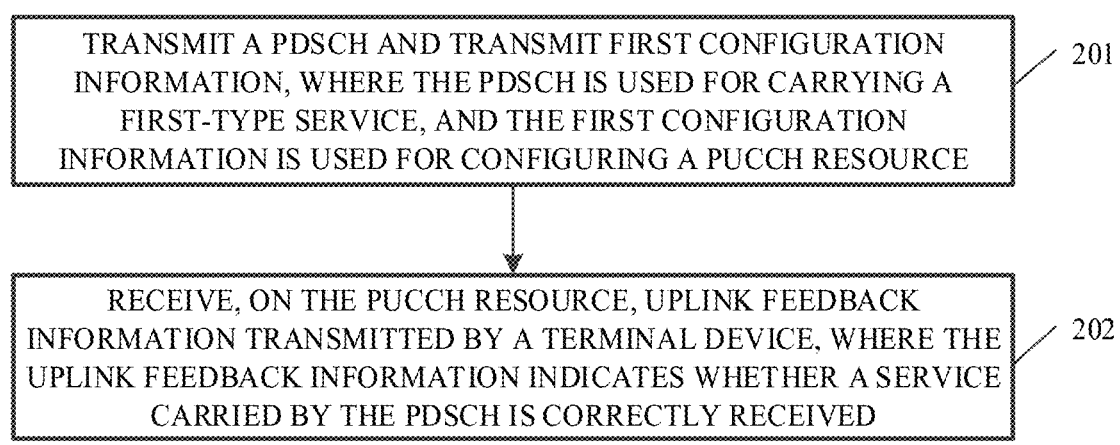
FIG. 2A is a schematic flowchart of a data transmission method provided in implementations of the disclosure.

Refer to FIG. 2A, which is a schematic flowchart of a data transmission method provided in implementations of the disclosure. The method is applicable to a network device. The method includes the following.

Step 201, a physical downlink shared channel (PDSCH) is transmitted, and first configuration information is transmitted. The PDSCH is used for carrying a first-type service. The first configuration information is used for configuring a physical uplink control channel (PUCCH) resource.

Step 202, uplink feedback information transmitted by a terminal device is received on the PUCCH resource. The uplink feedback information indicates whether a service carried by the PDSCH is correctly received.

As can be seen, in implementations of the disclosure, the network device transmits the PDSCH and the first configuration information, where the PDSCH is used for carrying the first-type service, and the first configuration information is used for configuring the PUCCH resource. The network device receives, on the PUCCH resource, the uplink feedback information transmitted by the terminal device, where the uplink feedback information indicates whether the service carried by the PDSCH is correctly received. Since an uplink feedback mechanism for the first-type service is introduced, the network device can receive the uplink feedback information on the PUCCH resource. As such, the network device can determine, according to the uplink feedback information, whether to retransmit the PDSCH, which can reduce packet loss and packet errors, thereby improving transmission reliability of the first-type service.

Optionally, the first-type service is transmitted in a multicast manner or a broadcast manner.

Optionally, the first-type service is a multimedia broadcast multicast service (MBMS).

Optionally, the first configuration information includes one or more configuration information.

As can be seen, in implementations of the disclosure, when the first-type service is transmitted in a multicast manner or a broadcast manner, or the first-type service is an MBMS, it is possible to improve transmission reliability of multicast services or broadcast services.

Method Embodiment 1

In an implementation of the disclosure, the PUCCH resource includes one first PUCCH resource. The uplink feedback information includes negative acknowledgement (NACK) feedback information. Each terminal device that needs to transmit the NACK feedback information uses the one first PUCCH resource to transmit the NACK feedback information.

The one first PUCCH resource is used for transmitting a PUCCH, where the PUCCH is used for carrying the uplink feedback information.

As can be seen, in implementations of the disclosure, all the terminal devices that need to transmit the NACK feedback information share the same PUCCH resource, which can significantly reduce overhead of the PUCCH resource.

In an implementation of the disclosure, the PUCCH resource includes multiple second PUCCH resources. The uplink feedback information includes NACK feedback information. Each terminal device that needs to transmit the NACK feedback information uses one of the multiple second PUCCH resources to transmit the NACK feedback information.

The multiple second PUCCH resources are used for transmitting a PUCCH(s), where the PUCCH is used for carrying the uplink feedback information.

Preferably, the multiple second PUCCH resources have different time-domain resources or different frequency-domain resources.

As can be seen, in implementations of the disclosure, multiple terminal devices that need to transmit the NACK feedback information share the same PUCCH resource, which can substantially reduce overhead of the PUCCH resource. Optionally, the second PUCCH resource used by the terminal device to transmit the NACK feedback information is determined according to a reference signal received power (RSRP) measured by the terminal device.

Specifically, the second PUCCH resource used by the terminal device to transmit the NACK feedback information is determined according to the RSRP measured by the terminal device and a first correspondence. The first correspondence is a correspondence between RSRPs and second PUCCH resources. The first correspondence may be transmitted by the network device, or may be stored at each terminal device.

As can be seen, in implementations of the disclosure, the terminal device transmits the NACK feedback information on a corresponding PUCCH resource according to the RSRP measured by the terminal device, such that the network device can determine the RSRP range in which the terminal device fails to receive data correctly, and can adjust a modulation and coding scheme (MCS) when scheduling retransmissions.

Optionally, the second PUCCH resource used by the terminal device to transmit the NACK feedback information is determined according to an identifier of the terminal device.

Specifically, the second PUCCH resource used by the terminal device to transmit the NACK feedback information is determined according to the identifier of the terminal device and a second correspondence. The second correspondence is a correspondence between identifiers of the terminal device and second PUCCH resources. The second correspondence may be transmitted by the network device, or may be stored in each terminal device.

Optionally, the identifier is a radio network temporary identifier (RNTI) of the terminal device or a member identifier of the terminal device in a communication group.

For example, a cell RNTI (C-RNTI) of the terminal device has 16 bits, the value of which is a after converting to decimal. If b PUCCH resources are configured by a network, a PUCCH resource corresponding to the terminal device is a PUCCH resource corresponding to mod (a, b).

Optionally, the method further includes the following. If a first amount of NACK feedback information received on the PUCCH resource is greater than or equal to a first threshold value, the PDSCH will be retransmitted.

The first threshold value may be, for example, 1, 5, 10, or other values. The first threshold value may also be determined according to the number of terminal devices, for example, the first threshold value is 10%, 20%, 30% or other values of the number of terminal devices, which is not limited herein.

For example, the network device transmits the PDSCH to 10 terminal devices, and 3 NACK feedback information are received. If the first threshold value is 20% of the number of terminal devices, namely 2, the PDSCH will be retransmitted because 3>2.

Optionally, the first amount is determined according to an energy or power of the PUCCH resource measured by the network device.

For example, for a terminal device in a radio resource control (RRC)-connected mode, the network device performs power control on a PUCCH transmitted by the terminal device, such that an energy of a PUCCH transmitted by each terminal device is nearly equal at a network side, thereby avoiding interference between PUCCHs of different users.

For another example, through power control, the network device makes an expected power of a PUCCH transmitted by each terminal device be P1 at a network side. If multiple terminal devices share the same PUCCH transmission resource, by measuring an energy of the PUCCH resource, the network device can determine how many terminal devices transmit a PUCCH. If terminal devices that transmit the NACK feedback information share the PUCCH transmission resource, and the network device measures that the energy of the PUCCH resource is P2, it can be determined that there are P2/P1 terminal devices that transmit the NACK feedback information.

As can be seen, in implementations of the disclosure, by detecting the energy of the PUCCH resource, the network device can determine how many terminal devices transmit the NACK feedback information, and determine, in connection with the first threshold value, whether to perform data retransmission.

Optionally, an information format of the NACK feedback information includes a first sequence. The first sequence is determined according to a cell-identity (ID) or determined according to the first configuration information.

Optionally, a transmission format of the NACK feedback information includes PUCCH format 0.

Optionally, the uplink feedback information is transmitted by the terminal device when a measured RSRP is greater than a fifth threshold value, or the uplink feedback information is transmitted by the terminal device when a measured RSRP is less than a sixth threshold value.

For example, the fifth threshold value is configured by a network, and the terminal device determines whether the measured RSRP is greater than the threshold value. The terminal device transmits the uplink feedback information only when the RSRP measured by the terminal is greater than the threshold value. Specifically, in case only one first PUCCH resource is configured by the network, the terminal transmits the uplink feedback information (that is, NACK information) to the network on the PUCCH only when the terminal needs to feed back NACK. If the PDSCH is correctly received by the terminal, that is, the corresponding uplink feedback information is acknowledgement (ACK), the terminal does not need to transmit the uplink feedback information to the network. If the RSRP measured by the terminal device is less than the threshold value, the terminal does not transmit the uplink feedback information to the network no matter whether the detection result is NACK or ACK.

Optionally, the first configuration information includes at least one of: RRC signaling, downlink control information (DCI), or a system information block (SIB).

For example, the terminal device is a terminal device in an RRC idle mode, and thus the PUCCH resource cannot be configured via the RRC signaling or the DCI. The network device can configure the PUCCH resource via the SIB, which may be performed as follows.

One first PUCCH resource is configured via the SIB, and all terminal devices can share the one first PUCCH resource to transmit the NACK feedback information.

Multiple second PUCCH resources and one or more threshold information (threshold values) are configured via the SIB, and a corresponding second PUCCH resource can be determined according to the threshold information. For example, 4 second PUCCH resources and 3 RSRP threshold values are configured by a network, and as such, second PUCCH resources corresponding to different RSRP ranges can be determined according to the 3 threshold values.

Method Embodiment 2

In an implementation of the disclosure, the PUCCH resource includes one third PUCCH resource and one fourth PUCCH resource. The uplink feedback information includes NACK feedback information and an ACK feedback information. Each terminal device that needs to transmit the NACK feedback information uses the one third PUCCH resource to transmit the NACK feedback information, and each terminal device that needs to transmit the ACK feedback information uses the one fourth PUCCH resource to transmit the ACK feedback information.

Compared with method embodiment 1, one shared PUCCH resource is introduced in order for the terminal device to transmit the ACK feedback information. In other words, the network device configures two PUCCH resources: the one third PUCCH resource and the one fourth PUCCH resource, where each PUCCH resource is an uplink transmission resource shared by multiple terminal devices. The terminal device selects a corresponding PUCCH resource for uplink feedback according to a state (ACK or NACK) of MBMS data reception.

In an implementation of the disclosure, the PUCCH resource includes multiple fifth PUCCH resources and multiple sixth PUCCH resources. Each terminal device that needs to transmit NACK feedback information uses one of the multiple fifth PUCCH resources to transmit the NACK feedback information, and each terminal device that needs to transmit ACK feedback information uses one of the multiple sixth PUCCH resources to transmit the ACK feedback information.

As can be seen, in implementations of the disclosure, a PUCCH resource used for feeding back ACK and a PUCCH resource used for feeding back NACK are configured respectively. The network device can know respectively how many terminal devices transmit the ACK feedback information and how many terminal devices transmit the NACK feedback information, and compared with method embodiment 1, the network device can know more information.

Optionally, the fifth PUCCH resource used by the terminal device to transmit the NACK feedback information is determined according to an RSRP measured by the terminal device, and/or the sixth PUCCH resource used by the terminal device to transmit the ACK feedback information is determined according to an RSRP measured by the terminal device.

Optionally, the fifth PUCCH resource used by the terminal device to transmit the NACK feedback information is determined according to an identifier of the terminal device, and/or the sixth PUCCH resource used by the terminal device to transmit the ACK feedback information is determined according to an identifier of the terminal device.

Optionally, the method further includes the following. If a second amount of NACK feedback information received on the PUCCH resource is greater than or equal to a second threshold value, the PDSCH will be retransmitted. Or if a third amount of ACK feedback information received on the PUCCH resource is less than or equal to a third threshold value, the PDSCH will be retransmitted. Or if a ratio of a fourth amount to a fifth amount is greater than or equal to a fourth threshold value, the PDSCH will be retransmitted, where the fourth amount is an amount of NACK feedback information received on the PUCCH resource, and the fifth amount is an amount of ACK feedback information received on the PUCCH resource.

Optionally, the second amount, the third amount, the fourth amount, or the fifth amount is determined according to an energy or power of the PUCCH resource measured by the network device.

Optionally, an information format of the NACK feedback information includes a first sequence. The first sequence is determined according to a cell-ID or determined according to the first configuration information.

Optionally, a transmission format of the NACK feedback information includes PUCCH format 0.

Optionally, the uplink feedback information is transmitted by the terminal device when a measured RSRP is greater than a fifth threshold value, or the uplink feedback information is transmitted by the terminal device when a measured RSRP is less than a sixth threshold value.

For example, the fifth threshold value is configured by a network, and the terminal device determines whether the measured RSRP is greater than the threshold value. The terminal device transmits the uplink feedback information only when the RSRP measured by the terminal is greater than the threshold value. Specifically, in case one third PUCCH resource and one fourth PUCCH resource are configured by the network, if the PDSCH is correctly received by the terminal, that is, the corresponding uplink feedback information is ACK, the terminal uses the one fourth PUCCH resource to transmit the uplink feedback information (that is, ACK information) to the network; and if the PDSCH is not correctly received by the terminal, that is, the corresponding uplink feedback information is NACK, the terminal uses the one third PUCCH resource to transmit the uplink feedback information (that is, NACK information) to the network. If the RSRP measured by the terminal device is less than the threshold value, the terminal does not transmit the uplink feedback information to the network no matter whether the detection result is NACK or ACK.

Optionally, the first configuration information includes at least one of: RRC signaling, DCI, or an SIB.

It is to be noted that, for the specific implementation process of this embodiment, reference can be made to the specific implementation process of the foregoing method embodiment, which will not be elaborated again herein.

Method Embodiment 3

In an implementation of the disclosure, the PUCCH resource includes one seventh PUCCH resource and multiple eighth PUCCH resources. The uplink feedback information includes NACK feedback information and an ACK feedback message. Each terminal device that needs to transmit the NACK feedback information uses the one seventh PUCCH resource to transmit the NACK feedback information. Each terminal device that needs to transmit the ACK feedback information uses one of the multiple eighth PUCCH resources, and different terminal devices use different eighth PUCCH resources.

Compared with method embodiment 2, the network device configures a shared seventh PUCCH resource used for feeding back NACK, and configures for each terminal device a separate eighth PUCCH resource used for feeding back ACK. If MBMS data is correctly detected by the terminal device, the terminal device transmits the ACK feedback information to the network device on the corresponding eighth PUCCH resource corresponding. If MBMS data is not correctly detected by the terminal device, the terminal device transmits the NACK feedback information to the network device on the shared seventh PUCCH resource.

Optionally, frequency-domain resources, time-domain resources, or code-domain resources of different eighth PUCCH resources are different.

Optionally, an information format of the NACK feedback information includes a first sequence. The first sequence is determined according to a cell-ID or determined according to the first configuration information.

Optionally, a transmission format of the NACK feedback information includes PUCCH format 0.

Optionally, the uplink feedback information is transmitted by the terminal device when a measured RSRP is greater than a fifth threshold value, or the uplink feedback information is transmitted by the terminal device when a measured RSRP is less than a sixth threshold value.

For example, the fifth threshold value is configured by a network, and the terminal device determines whether the measured RSRP is greater than the threshold value. The terminal device transmits the uplink feedback information only when the RSRP measured by the terminal is greater than the threshold value. Specifically, in case one seventh PUCCH resource and multiple eighth PUCCH resources are configured by the network, where different terminal devices correspond to different eighth PUCCH resources, if the PDSCH is correctly received by the terminal, that is, the corresponding uplink feedback information is ACK, the terminal uses the eighth PUCCH resource corresponding thereto to transmit the uplink feedback information (that is, ACK information) to the network; if the PDSCH is not correctly received by the terminal, that is, the corresponding uplink feedback information is NACK, the terminal uses the one seventh PUCCH resource to transmit the uplink feedback information (that is, NACK information) to the network. If the RSRP measured by the terminal device is less than the threshold value, the terminal does not transmit the uplink feedback information to the network no matter whether the detection result is NACK or ACK.

Optionally, the first configuration information includes at least one of: RRC signaling, DCI, or an SIB.

As can be seen, in implementations of the disclosure, the network device allocates a shared seventh PUCCH resource to the terminal devices, and then can determine whether there is a terminal device that fails to receive data correctly. If the NACK feedback information is detected, the network device determines that there is a terminal device(s) that fails to receive data correctly and retransmission is needed. The network device allocates a separate eighth PUCCH resource, and then can determine which terminal device(s) receives data correctly. For multicast communication, if the network device knows information of all terminal devices, the network device can determine, according to the ACK feedback information, the terminal device(s) that transmits the ACK feedback information, and other terminal devices that did not transmit the ACK feedback information may be in a discontinuous transmission (DTX) state or a NACK state. If the NACK feedback information is not detected by the network device, the network device can determine that there is a terminal device(s) that is in the DTX state, that is, the first configuration information is not successfully detected by the terminal device(s), and it is necessary to improve transmission reliability of the first configuration information. In addition, the network device can determine that the terminal devices that did not transmit the ACK feedback information fail to receive data correctly, and therefore, the network device can transmit retransmitted data to these terminal devices that fail to receive data correctly in a unicast manner.

It is to be noted that, for the specific implementation process of this embodiment, reference can be made to the specific implementation process of the foregoing method embodiment, which will not be elaborated again herein.

Method Embodiment 4

In an implementation of the disclosure, the PUCCH resource includes multiple ninth PUCCH resources and multiple tenth PUCCH resources. The uplink feedback information includes NACK feedback information and an ACK feedback message. Each terminal device that needs to transmit the NACK feedback information uses one of the multiple ninth PUCCH resources, and different terminal devices use different ninth PUCCH resources. Each terminal device that needs to transmit the ACK feedback information uses one of the multiple tenth PUCCH resources, and different terminal devices use different tenth PUCCH resources.

Compared with method embodiment 3, the network device allocates to each terminal device a separate tenth PUCCH resource used for feeding back ACK information and a separate ninth PUCCH resource used for feeding back NACK information. If MBMS data is correctly detected by the terminal device, the terminal device transmits the ACK feedback information to the network device on the corresponding tenth PUCCH resource. If MBMS data is not correctly detected by the terminal, the terminal transmits the NACK feedback information to the network device on the corresponding ninth PUCCH resource.

Optionally, frequency-domain resources, time-domain resources, or code-domain resources of different ninth PUCCH resources are different. Frequency-domain resources, time-domain resources, or code-domain resources of different tenth PUCCH resources are different.

Optionally, an information format of the NACK feedback information includes a first sequence. The first sequence is determined according to a cell-ID or determined according to the first configuration information.

Optionally, a transmission format of the NACK feedback information includes PUCCH format 0.

Optionally, the uplink feedback information is transmitted by the terminal device when a measured RSRP is greater than a fifth threshold value, or the uplink feedback information is transmitted by the terminal device when a measured RSRP is less than a sixth threshold value.

For example, the fifth threshold value is configured by a network, and the terminal device determines whether the measured RSRP is greater than the threshold value. The terminal device transmits the uplink feedback information only when the RSRP measured by the terminal is greater than the threshold value. Specifically, in case multiple ninth PUCCH resources and multiple tenth PUCCH resources are configured by the network, where different terminal devices correspond to different ninth PUCCH resources and different terminal devices correspond to different tenth PUCCH resources, if the PDSCH is correctly received by the terminal, that is, the corresponding uplink feedback information is ACK, the terminal uses the tenth PUCCH resource corresponding thereto to transmit the uplink feedback information (that is, ACK information) to the network; if the PDSCH is not correctly received by the terminal, that is, the corresponding uplink feedback information is NACK, the terminal uses the ninth PUCCH resource corresponding thereto to transmit the uplink feedback information (that is, the NACK information) to the network. If the RSRP measured by the terminal device is less than the threshold value, the terminal does not transmit the uplink feedback information to the network no matter whether the detection result is NACK or ACK.

Optionally, the first configuration information includes at least one of: RRC signaling, DCI, or an SIB.

As can be seen, in implementations of the disclosure, a separate ninth PUCCH resource and a separate tenth PUCCH resource are allocated to each terminal by the network. As such, the network device can determine, through PUCCH detection, which terminal device(s) feeds back ACK and which terminal device(s) feeds back NACK. In addition, it is possible for the network device to determine which terminal device(s) is in a DTX state. In other words, the network device can know reception states of all terminal devices in a group, thereby realizing more accurate retransmission scheduling during retransmission.

For example, for a terminal device in the DTX state, the network device needs to improve detection performance of DCI, such as improving an aggregation level of DCI. For a terminal device in a NACK state, the network needs to improve detection performance of a data channel, such as lowering an MCS level.

It is to be noted that, for the specific implementation process of this embodiment, reference can be made to the specific implementation process of the foregoing method embodiment, which will not be elaborated again herein.

Method Embodiment 5

In an implementation of the disclosure, the amount of PDSCHs is multiple. The multiple PDSCHs are transmitted by the network device on different time-domain resources, and the multiple PDSCHs carry the same data.

Optionally, the PUCCH resource is after time-domain resources of the multiple PDSCHs.

Optionally, if NACK feedback information is transmitted on the PUCCH resource, the PUCCH resource is after time-domain resources of the multiple PDSCHs.

Optionally, the first configuration information includes multiple DCIs, where each of the DCIs is used for scheduling one of the PDSCHs, and each of the DCIs is further used for determining a transmission resource of a PUCCH used for carrying ACK feedback information.

Optionally, if one PDSCH is successfully received by the terminal device, the ACK feedback information is transmitted by the terminal device on a transmission resource of a PUCCH corresponding to the one PDSCH. If some of the multiple PDSCHs are successfully received by the terminal device, the ACK feedback information is transmitted by the terminal device on a transmission resource of a PUCCH corresponding to a PDSCH that is first successfully received. If some of the multiple PDSCHs are successfully received by the terminal device, an RSRP of each of the successfully received PDSCHs is measured by the terminal device, and the ACK feedback information is transmitted by the terminal device on a transmission resource of a PUCCH corresponding to a PDSCH having the highest RSRP.

For example, the network device transmits 4 PDSCHs (where the 4 PDSCHs carry the same data), and configures respectively for each PDSCH a PUCCH resource used for feeding back ACK and a PUCCH resource used for feeding back NACK. If no PDSCH is successfully detected by the terminal device, NACK information is transmitted on a PUCCH resource used for feeding back NACK corresponding to a last PDSCH. If one PDSCH, such as a $2^{nd}$ PDSCH, is successfully detected by the terminal device, ACK information is transmitted by the terminal device on a PUCCH resource used for feeding back ACK corresponding to the PDSCH. If 2 PDSCHs, such as a $1^{st}$ PDSCH and a $2^{nd}$ PDSCH, are successfully detected by the terminal device, an RSRP of each of the $1^{st}$ PDSCH and the $2^{nd}$ PDSCH is measured by the terminal device, which is RSRP 1 and RSRP 2 respectively and RSRP 2>RSRP 1, and then ACK information is transmitted by the terminal on a PUCCH resource used for feeding back ACK corresponding to the $2^{nd}$ PDSCH.

Each PDSCH is in quasi co-location (QCL)-Type D with each channel status indicator reference signal (CSI-RS) resource respectively, or each PDSCH is in QCL-Type D with each synchronization signal/physical broadcast channel (SS/PBCH) resource respectively.

It should be understood that, different CSI-RS resources correspond to different beam directions, and different SS/PBCH resources correspond to different beam directions. "Each PDSCH is in QCL-Type D with each CSI-RS resource respectively" means that different PDSCHs are transmitted through different beams.

For a broadcast multicast service, the network device transmits MBMS data alternately through multiple beams. The terminal device detects the MBMS data on each beam respectively. If detection succeeds in at least one direction, the terminal device can consider that the MBMS data is successfully detected. If detection fails in all directions, the terminal device considers that detection of the MBMS fails. Therefore, the terminal can determine whether the data is successfully detected according to detection results in multiple directions, and feed back to a network.

Figure 2B:
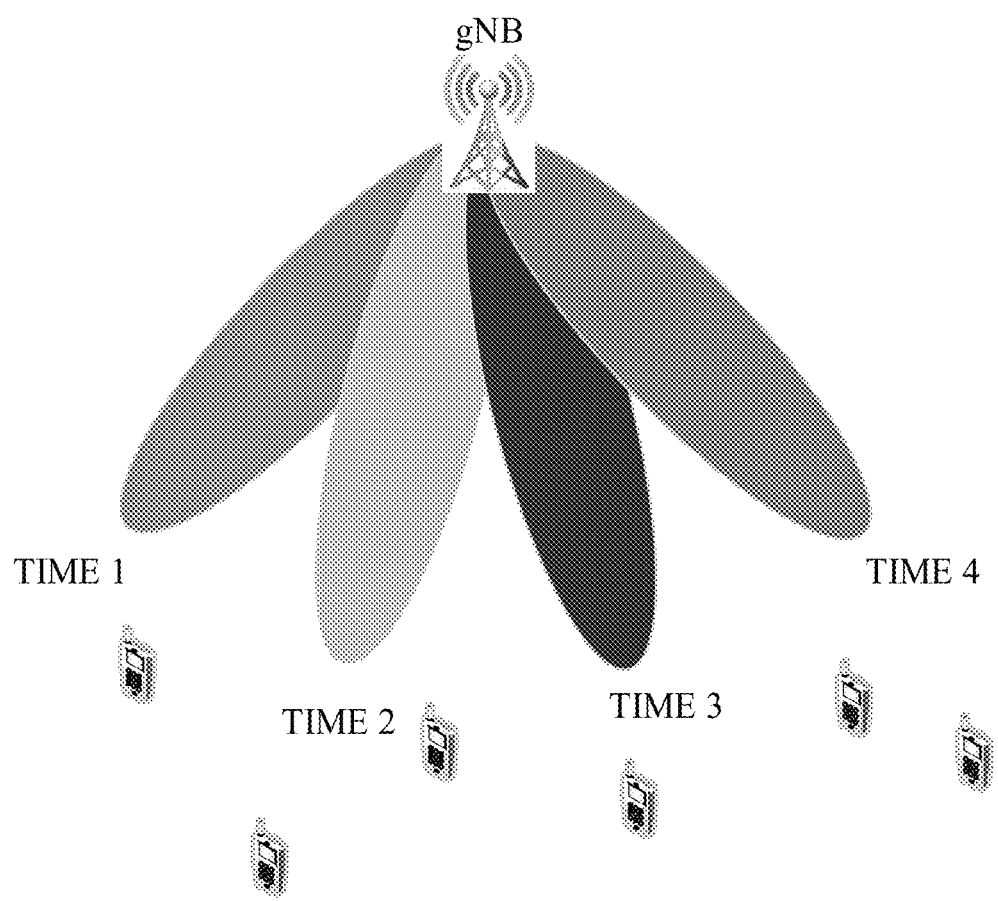
FIG. 2B is a schematic structural diagram of data transmission by a network device provided in implementations of the disclosure.
Figure 2C:
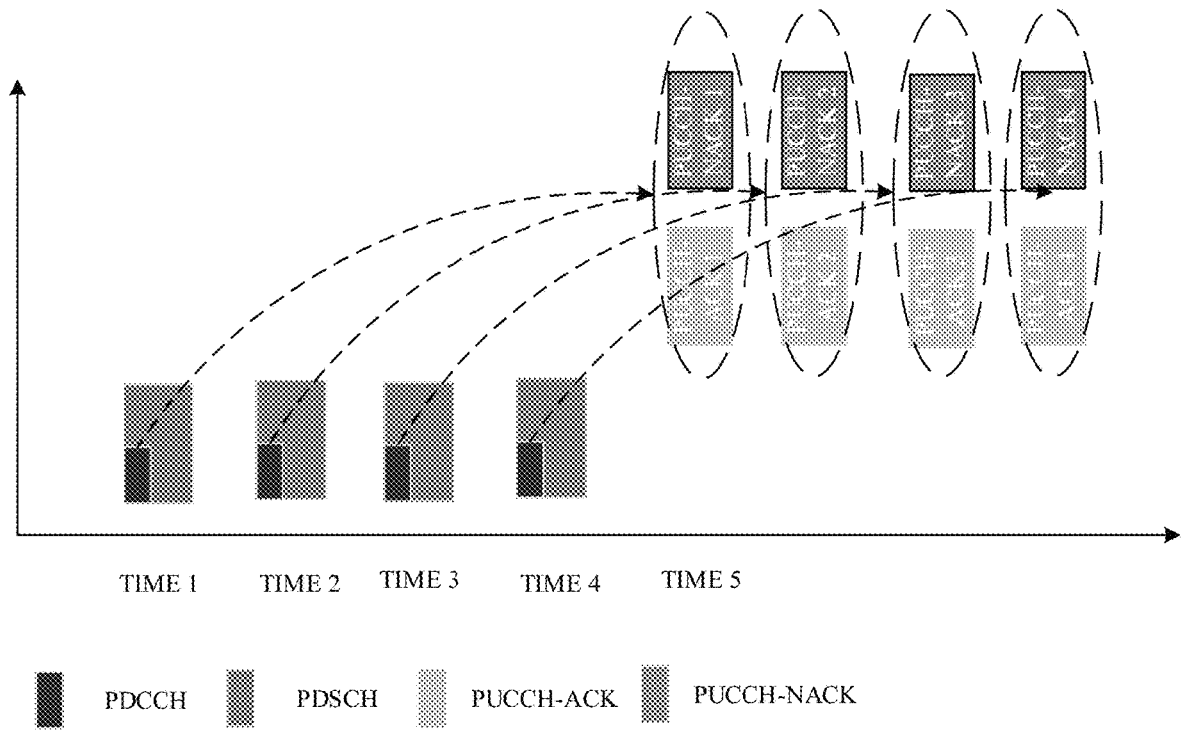
FIG. 2C is a schematic structural diagram of physical uplink control channel (PUCCH) resources and their corresponding time-domain resources provided in implementations of the disclosure.

FIG. 2B is a schematic structural diagram of data transmission by a network device provided in implementations of the disclosure. As illustrated in FIG. 2B, the network device (gNB) transmits the MBMS data alternately through 4 beams at 4 time points (Time 1, Time 2, Time 3, and Time 4). The terminal device detects the MBMS data on each beam respectively. If detection succeeds in at least one direction, the terminal device can consider that the MBMS data is successfully detected. If detection fails in all directions, the terminal device considers that detection of the MBMS fails. FIG. 2C is a schematic structural diagram of PUCCH resources and their corresponding time-domain resources provided in implementations of the disclosure. As illustrated in FIG. 2C, the network device configures for the terminal device(s) PUCCH resources used for transmitting the uplink feedback information. The 4 beams illustrated in FIG. 2B correspond to the 4 PUCCH resources illustrated in FIG. 2C. Each PUCCH resource includes a PUCCH-ACK resource and a PUCCH-NACK resource, where the PUCCH-ACK resource is used for the terminal device to transmit ACK information to the network, and the PUCCH-NACK resource is used for the terminal device to transmit NACK information to the network. The PUCCH resources are after all time-domain resources used for transmitting the MBMS data, such that the terminal device can determine whether detection succeeds according to detection results of the MBMS data transmitted in all directions.

As can be seen, in implementations of the disclosure, the configured PUCCH resource is after the resources for transmitting the MBMS data using all beam directions, such that the terminal device can determine whether the MBMS data is correctly received according to detection results of all beam directions, and feed back accordingly.

Figure 3:
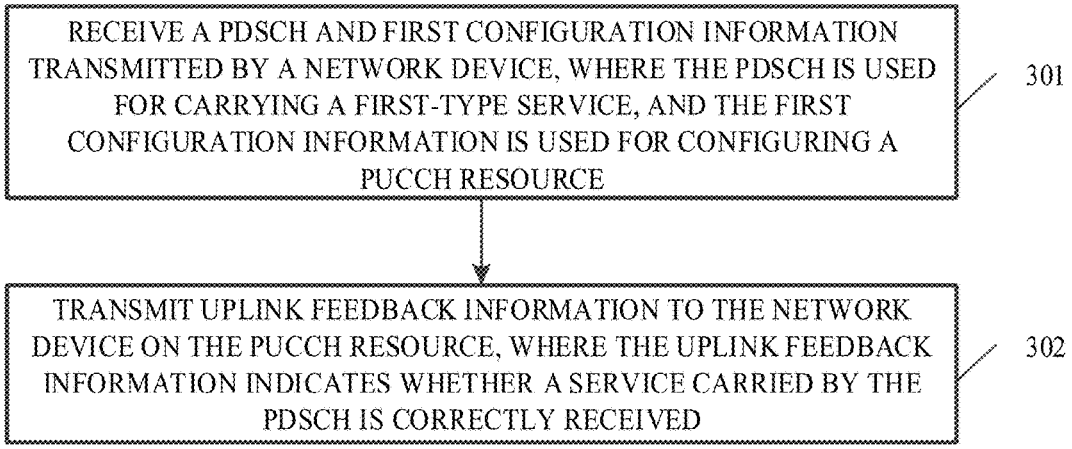
FIG. 3 is a schematic flowchart of another data transmission method provided in implementations of the disclosure.

Refer to FIG. 3, which is a schematic flowchart of another data transmission method provided in implementations of the disclosure. The method is applicable to a terminal device. The method includes the following.

Step 301, a PDSCH and first configuration information transmitted by a network device are received. The PDSCH is used for carrying a first-type service. The first configuration information is used for configuring a PUCCH resource.

Step 302, uplink feedback information is transmitted to the network device on the PUCCH resource. The uplink feedback information indicates whether a service carried by the PDSCH is correctly received.

Optionally, the first-type service is transmitted in a multicast manner or a broadcast manner.

Optionally, the first-type service is an MBMS.

Optionally, the first configuration information includes one or more configuration information.

In an implementation of the disclosure, the PUCCH resource includes one first PUCCH resource. The uplink feedback information includes NACK feedback information. Each terminal device that needs to transmit the NACK feedback information uses the one first PUCCH resource to transmit the NACK feedback information.

Preferably, multiple second PUCCH resources have different time-domain resources or different frequency-domain resources.

In an implementation of the disclosure, the PUCCH resource includes multiple second PUCCH resources. The uplink feedback information includes NACK feedback information. Each terminal device that needs to transmit the NACK feedback information uses one of the multiple second PUCCH resources to transmit the NACK feedback information.

Optionally, the second PUCCH resource used by the terminal device to transmit the NACK feedback information is determined according to an RSRP measured by the terminal device.

Optionally, the second PUCCH resource used by the terminal device to transmit the NACK feedback information is determined according to an identifier of the terminal device.

Optionally, the identifier is an RNTI of the terminal device or a member identifier of the terminal device in a communication group.

Optionally, the method further includes the following. The PDSCH retransmitted by the network device is received, where the network device retransmits the PDSCH if a first amount of NACK feedback information received on the PUCCH resource is greater than or equal to a first threshold value.

In an implementation of the disclosure, the PUCCH resource includes one third PUCCH resource and one fourth PUCCH resource. The uplink feedback information includes NACK feedback information and an ACK feedback message. Each terminal device that needs to transmit the NACK feedback information uses the one third PUCCH resource to transmit the NACK feedback information, and each terminal device that needs to transmit the ACK feedback information uses the one fourth PUCCH resource to transmit the ACK feedback information.

In an implementation of the disclosure, the PUCCH resource includes multiple fifth PUCCH resources and multiple sixth PUCCH resources. Each terminal device that needs to transmit NACK feedback information uses one of the multiple fifth PUCCH resources to transmit the NACK feedback information, and each terminal device that needs to transmit ACK feedback information uses one of the multiple sixth PUCCH resources to transmit the ACK feedback information.

Optionally, the fifth PUCCH resource used by the terminal device to transmit the NACK feedback information is determined according to an RSRP measured by the terminal device, and/or the sixth PUCCH resource used by the terminal device to transmit the ACK feedback information is determined according to an RSRP measured by the terminal device.

Optionally, the fifth PUCCH resource used by the terminal device to transmit the NACK feedback information is determined according to an identifier of the terminal device, and/or the sixth PUCCH resource used by the terminal device to transmit the ACK feedback information is determined according to an identifier of the terminal device.

Optionally, the method further includes the following. The PDSCH retransmitted by the network device is received, where the network device retransmits the PDSCH if a second amount of NACK feedback information received on the PUCCH resource is greater than or equal to a second threshold value, or the network device retransmits the PDSCH if a third amount of ACK feedback information received on the PUCCH resource is less than or equal to a third threshold value, or the network device retransmits the PDSCH if a ratio of a fourth amount to a fifth amount is greater than or equal to a fourth threshold value, where the fourth amount is an amount of NACK feedback information received on the PUCCH resource, and the fifth amount is an amount of ACK feedback information received on the PUCCH resource.

Optionally, the first amount, the second amount, the third amount, the fourth amount, or the fifth amount is determined according to an energy or power of the PUCCH resource measured by the network device.

In an implementation of the disclosure, the PUCCH resource includes one seventh PUCCH resource and multiple eighth PUCCH resources. The uplink feedback information includes NACK feedback information and an ACK feedback message. Each terminal device that needs to transmit the NACK feedback information uses the one seventh PUCCH resource to transmit the NACK feedback information. Each terminal device that needs to transmit the ACK feedback information uses one of the multiple eighth PUCCH resources, and different terminal devices use different eighth PUCCH resources.

Optionally, frequency-domain resources, time-domain resources, or code-domain resources of different eighth PUCCH resources are different.

In an implementation of the disclosure, the PUCCH resource includes multiple ninth PUCCH resources and multiple tenth PUCCH resources. The uplink feedback information includes NACK feedback information and an ACK feedback message. Each terminal device that needs to transmit the NACK feedback information uses one of the multiple ninth PUCCH resources, and different terminal devices use different ninth PUCCH resources. Each terminal device that needs to transmit the ACK feedback information uses one of the multiple tenth PUCCH resources, and different terminal devices use different tenth PUCCH resources.

Optionally, frequency-domain resources, time-domain resources, or code-domain resources of different ninth PUCCH resources are different. Frequency-domain resources, time-domain resources, or code-domain resources of different tenth PUCCH resources are different.

Optionally, an information format of the NACK feedback information includes a first sequence. The first sequence is determined according to a cell-ID or determined according to the first configuration information.

Optionally, a transmission format of the NACK feedback information includes PUCCH format 0.

Optionally, the uplink feedback information is transmitted by the terminal device when a measured RSRP is greater than a fifth threshold value, or the uplink feedback information is transmitted by the terminal device when a measured RSRP is less than a sixth threshold value.

Optionally, the first configuration information includes at least one of: RRC signaling, DCI, or an SIB.

In an implementation of the disclosure, the amount of PDSCHs is multiple. The multiple PDSCHs are transmitted by the network device on different time-domain resources. The multiple PDSCHs carry the same data.

Optionally, the PUCCH resource is after time-domain resources of the multiple PDSCHs.

Optionally, if NACK feedback information is transmitted on the PUCCH resource, the PUCCH resource is after time-domain resources of the multiple PDSCHs.

Optionally, the first configuration information includes multiple DCIs, where each of the DCIs is used for scheduling one of the PDSCHs, and each DCI is further used for determining a transmission resource of a PUCCH used for carrying ACK feedback information.

Optionally, if one PDSCH is successfully received by the terminal device, the ACK feedback information is transmitted by the terminal device on a transmission resource of a PUCCH corresponding to the one PDSCH. If some of the multiple PDSCHs are successfully received by the terminal device, the ACK feedback information is transmitted by the terminal device on a transmission resource of a PUCCH corresponding to a PDSCH that is first successfully received.

It is to be noted that, for the specific implementation process of the method implementations at a terminal side, reference can be made to the specific implementation process of the foregoing method implementations at a network side, which will not be elaborated again herein.

Figure 4:
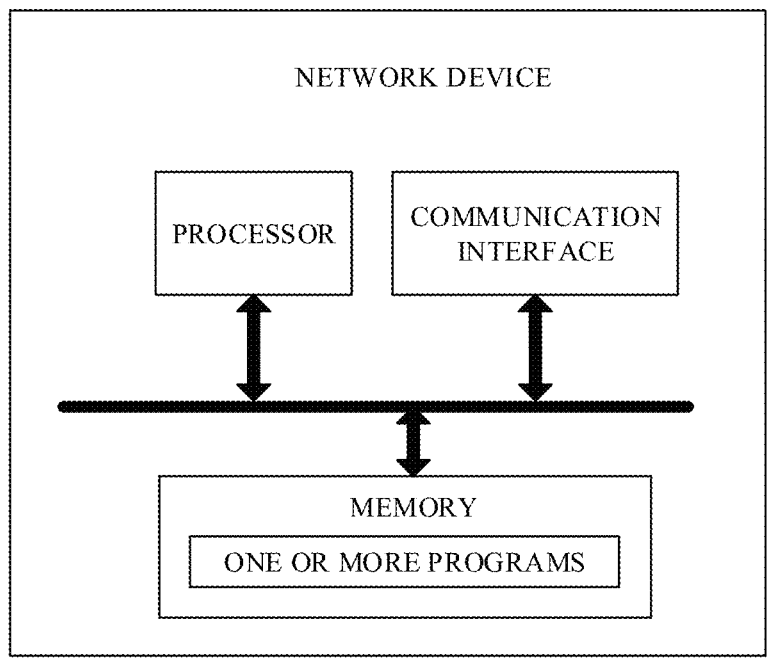
FIG. 4 is a schematic structural diagram of a network device provided in implementations of the disclosure.

Refer to FIG. 4, which is a schematic structural diagram of a network device provided in implementations of the disclosure. The network device includes one or more processors, one or more memories, one or more transceivers, and one or more programs. The one or more programs are stored in the memory and configured to be executed by the one or more processors. The programs include instructions used for performing the following operations.

A PDSCH is transmitted, and first configuration information is transmitted, where the PDSCH is used for carrying a first-type service, and the first configuration information is used for configuring a PUCCH resource. Uplink feedback information transmitted by a terminal device is received on the PUCCH resource, where the uplink feedback information indicates whether a service carried by the PDSCH is correctly received.

In an implementation of the disclosure, the first-type service is transmitted in a multicast manner or a broadcast manner.

In an implementation of the disclosure, the first-type service is an MBMS.

In an implementation of the disclosure, the PUCCH resource includes one first PUCCH resource. The uplink feedback information includes NACK feedback information. Each terminal device that needs to transmit the NACK feedback information uses the one first PUCCH resource to transmit the NACK feedback information.

In an implementation of the disclosure, the PUCCH resource includes multiple second PUCCH resources. The uplink feedback information includes NACK feedback information. Each terminal device that needs to transmit the NACK feedback information uses one of the multiple second PUCCH resources to transmit the NACK feedback information.

In an implementation of the disclosure, the second PUCCH resource used by the terminal device to transmit the NACK feedback information is determined according to an RSRP measured by the terminal device.

In an implementation of the disclosure, the second PUCCH resource used by the terminal device to transmit the NACK feedback information is determined according to an identifier of the terminal device.

In an implementation of the disclosure, the identifier is an RNTI of the terminal device or a member identifier of the terminal device in a communication group.

In an implementation of the disclosure, the programs include instructions further used for performing the following operations. Retransmit the PDSCH when a first amount of NACK feedback information received on the PUCCH resource is greater than or equal to a first threshold value.

In an implementation of the disclosure, the PUCCH resource includes one third PUCCH resource and one fourth PUCCH resource. The uplink feedback information includes NACK feedback information and an ACK feedback message. Each terminal device that needs to transmit the NACK feedback information uses the one third PUCCH resource to transmit the NACK feedback information, and each terminal device that needs to transmit the ACK feedback information uses the one fourth PUCCH resource to transmit the ACK feedback information.

In an implementation of the disclosure, the PUCCH resource includes multiple fifth PUCCH resources and multiple sixth PUCCH resources. Each terminal device that needs to transmit NACK feedback information uses one of the multiple fifth PUCCH resources to transmit the NACK feedback information, and each terminal device that needs to transmit ACK feedback information uses one of the multiple sixth PUCCH resources to transmit the ACK feedback information.

In an implementation of the disclosure, the fifth PUCCH resource used by the terminal device to transmit the NACK feedback information is determined according to an RSRP measured by the terminal device, and/or the sixth PUCCH resource used by the terminal device to transmit the ACK feedback information is determined according to an RSRP measured by the terminal device.

In an implementation of the disclosure, the fifth PUCCH resource used by the terminal device to transmit the NACK feedback information is determined according to an identifier of the terminal device, and/or the sixth PUCCH resource used by the terminal device to transmit the ACK feedback information is determined according to an identifier of the terminal device.

In an implementation of the disclosure, the programs include instructions further used for performing the following operations. Retransmit the PDSCH if a second amount of NACK feedback information received on the PUCCH resource is greater than or equal to a second threshold value, or retransmit the PDSCH if a third amount of ACK feedback information received on the PUCCH resource is less than or equal to a third threshold value, or retransmit the PDSCH if a ratio of a fourth amount to a fifth amount is greater than or equal to a fourth threshold value, where the fourth amount is an amount of NACK feedback information received on the PUCCH resource, and the fifth amount is an amount of ACK feedback information received on the PUCCH resource.

In an implementation of the disclosure, the first amount, the second amount, the third amount, the fourth amount, or the fifth amount is determined according to an energy or power of the PUCCH resource measured by the network device.

In an implementation of the disclosure, the PUCCH resource includes one seventh PUCCH resource and multiple eighth PUCCH resources. The uplink feedback information includes NACK feedback information and an ACK feedback message. Each terminal device that needs to transmit the NACK feedback information uses the one seventh PUCCH resource to transmit the NACK feedback information. Each terminal device that needs to transmit the ACK feedback information uses one of the multiple eighth PUCCH resources, and different terminal devices use different eighth PUCCH resources.

In an implementation of the disclosure, frequency-domain resources, time-domain resources, or code-domain resources of different eighth PUCCH resources are different.

In an implementation of the disclosure, the PUCCH resource includes multiple ninth PUCCH resources and multiple tenth PUCCH resources. The uplink feedback information includes NACK feedback information and an ACK feedback message. Each terminal device that needs to transmit the NACK feedback information uses one of the multiple ninth PUCCH resources, and different terminal devices use different ninth PUCCH resources. Each terminal device that needs to transmit the ACK feedback information uses one of the multiple tenth PUCCH resources, and different terminal devices use different tenth PUCCH resources.

In an implementation of the disclosure, frequency-domain resources, time-domain resources, or code-domain resources of different ninth PUCCH resources are different. Frequency-domain resources, time-domain resources, or code-domain resources of different tenth PUCCH resources are different.

In an implementation of the disclosure, an information format of the NACK feedback information includes a first sequence. The first sequence is determined according to a cell-ID or determined according to the first configuration information.

In an implementation of the disclosure, a transmission format of the NACK feedback information includes PUCCH format 0.

In an implementation of the disclosure, the uplink feedback information is transmitted by the terminal device when a measured RSRP is greater than a fifth threshold value, or the uplink feedback information is transmitted by the terminal device when a measured RSRP is less than a sixth threshold value.

In an implementation of the disclosure, the first configuration information includes at least one of: RRC signaling, DCI, or an SIB.

In an implementation of the disclosure, the amount of PDSCHs is multiple. The multiple PDSCHs are transmitted by the network device on different time-domain resources. The multiple PDSCHs carry the same data.

In an implementation of the disclosure, the PUCCH resource is after time-domain resources of the multiple PDSCHs.

In an implementation of the disclosure, if NACK feedback information is transmitted on the PUCCH resource, the PUCCH resource is after time-domain resources of the multiple PDSCHs.

In an implementation of the disclosure, the first configuration information includes multiple DCIs, where each of the DCIs is used for scheduling one of the PDSCHs, and each of the DCIs is further used for determining a transmission resource of a PUCCH used for carrying ACK feedback information.

In an implementation of the disclosure, if one PDSCH is successfully received by the terminal device, the ACK feedback information is transmitted by the terminal device on a transmission resource of a PUCCH corresponding to the one PDSCH. If some of the multiple PDSCHs are successfully received by the terminal device, the ACK feedback information is transmitted by the terminal device on a transmission resource of a PUCCH corresponding to a PDSCH that is first successfully received.

It is to be noted that, for the specific implementation process of this embodiment, reference can be made to the specific implementation process of the foregoing method embodiment, which will not be elaborated again herein.

Figure 5:
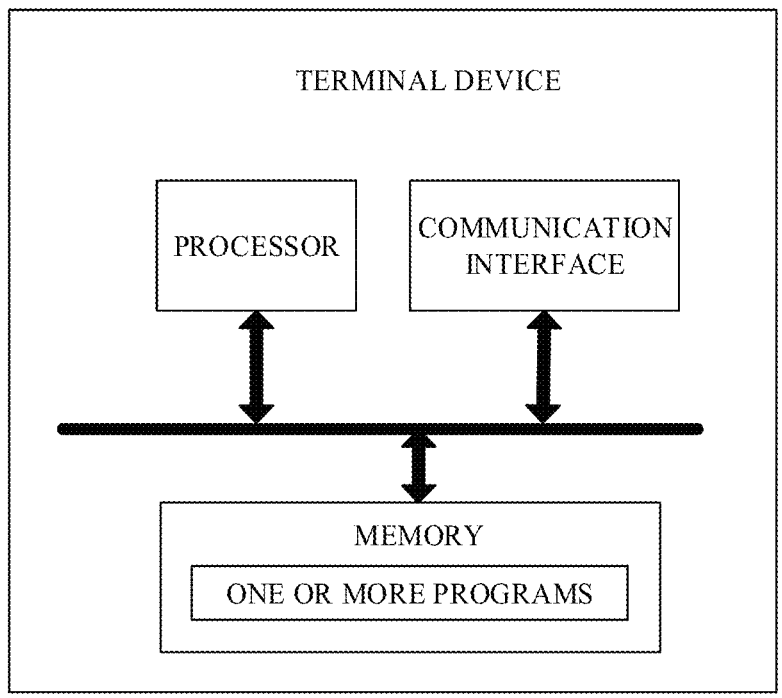
FIG. 5 is a schematic structural diagram of a terminal device provided in implementations of the disclosure.

Refer to FIG. 5, which is a schematic structural diagram of a terminal device provided in implementations of the disclosure. The terminal device includes one or more processors, one or more memories, one or more transceivers, and one or more programs. The one or more programs are stored in the memory and configured to be executed by the one or more processors. The programs include instructions used for performing the following operations.

A PDSCH and first configuration information transmitted by a network device are received, where the PDSCH is used for carrying a first-type service, and the first configuration information is used for configuring a PUCCH resource. Uplink feedback information is transmitted to the network device on the PUCCH resource, where the uplink feedback information indicates whether a service carried by the PDSCH is correctly received.

In an implementation of the disclosure, the first-type service is transmitted in a multicast manner or a broadcast manner.

In an implementation of the disclosure, the first-type service is an MBMS.

In an implementation of the disclosure, the PUCCH resource includes one first PUCCH resource. The uplink feedback information includes NACK feedback information. Each terminal device that needs to transmit the NACK feedback information uses the one first PUCCH resource to transmit the NACK feedback information.

In an implementation of the disclosure, the PUCCH resource includes multiple second PUCCH resources. The uplink feedback information includes NACK feedback information. Each terminal device that needs to transmit the NACK feedback information uses one of the multiple second PUCCH resources to transmit the NACK feedback information.

In an implementation of the disclosure, the second PUCCH resource used by the terminal device to transmit the NACK feedback information is determined according to an RSRP measured by the terminal device.

In an implementation of the disclosure, the second PUCCH resource used by the terminal device to transmit the NACK feedback information is determined according to an identifier of the terminal device.

In an implementation of the disclosure, the identifier is an RNTI of the terminal device or a member identifier of the terminal device in a communication group.

In an implementation of the disclosure, the programs include instructions further used for performing the following operations. The PDSCH retransmitted by the network device is received, where the network device retransmits the PDSCH if a first amount of NACK feedback information received on the PUCCH resource is greater than or equal to a first threshold value.

In an implementation of the disclosure, the PUCCH resource includes one third PUCCH resource and one fourth PUCCH resource. The uplink feedback information includes NACK feedback information and an ACK feedback message. Each terminal device that needs to transmit the NACK feedback information uses the one third PUCCH resource to transmit the NACK feedback information, and each terminal device that needs to transmit the ACK feedback information uses the one fourth PUCCH resource to transmit the ACK feedback information.

In an implementation of the disclosure, the PUCCH resource includes multiple fifth PUCCH resources and multiple sixth PUCCH resources. Each terminal device that needs to transmit NACK feedback information uses one of the multiple fifth PUCCH resources to transmit the NACK feedback information, and each terminal device that needs to transmit ACK feedback information uses one of the multiple sixth PUCCH resources to transmit the ACK feedback information.

In an implementation of the disclosure, the fifth PUCCH resource used by the terminal device to transmit the NACK feedback information is determined according to an RSRP measured by the terminal device, and/or the sixth PUCCH resource used by the terminal device to transmit the ACK feedback information is determined according to an RSRP measured by the terminal device.

In an implementation of the disclosure, the fifth PUCCH resource used by the terminal device to transmit the NACK feedback information is determined according to an identifier of the terminal device, and/or the sixth PUCCH resource used by the terminal device to transmit the ACK feedback information is determined according to an identifier of the terminal device.

In an implementation of the disclosure, the programs include instructions further used for performing the following operations. The PDSCH retransmitted by the network device is received, where the network device retransmits the PDSCH if a second amount of NACK feedback information received on the PUCCH resource is greater than or equal to a second threshold value, or the network device retransmits the PDSCH if a third amount of ACK feedback information received on the PUCCH resource is less than or equal to a third threshold value, or the network device retransmits the PDSCH if a ratio of a fourth amount to a fifth amount is greater than or equal to a fourth threshold value, where the fourth amount is an amount of NACK feedback information received on the PUCCH resource, and the fifth amount is an amount of ACK feedback information received on the PUCCH resource.

In an implementation of the disclosure, the first amount, the second amount, the third amount, the fourth amount, or the fifth amount is determined according to an energy or power of the PUCCH resource measured by the network device.

In an implementation of the disclosure, the PUCCH resource includes one seventh PUCCH resource and multiple eighth PUCCH resources. The uplink feedback information includes NACK feedback information and an ACK feedback message. Each terminal device that needs to transmit the NACK feedback information uses the one seventh PUCCH resource to transmit the NACK feedback information. Each terminal device that needs to transmit the ACK feedback information uses one of the multiple eighth PUCCH resources, and different terminal devices use different eighth PUCCH resources.

In an implementation of the disclosure, frequency-domain resources, time-domain resources, or code-domain resources of different eighth PUCCH resources are different.

In an implementation of the disclosure, the PUCCH resource includes multiple ninth PUCCH resources and multiple tenth PUCCH resources. The uplink feedback information includes NACK feedback information and an ACK feedback message. Each terminal device that needs to transmit the NACK feedback information uses one of the multiple ninth PUCCH resources, and different terminal devices use different ninth PUCCH resources. Each terminal device that needs to transmit the ACK feedback information uses one of the multiple tenth PUCCH resources, and different terminal devices use different tenth PUCCH resources.

In an implementation of the disclosure, frequency-domain resources, time-domain resources, or code-domain resources of different ninth PUCCH resources are different. Frequency-domain resources, time-domain resources, or code-domain resources of different tenth PUCCH resources are different.

In an implementation of the disclosure, an information format of the NACK feedback information includes a first sequence. The first sequence is determined according to a cell-ID or determined according to the first configuration information.

In an implementation of the disclosure, a transmission format of the NACK feedback information includes PUCCH format 0.

In an implementation of the disclosure, the uplink feedback information is transmitted by the terminal device when a measured RSRP is greater than a fifth threshold value, or the uplink feedback information is transmitted by the terminal device when a measured RSRP is less than a sixth threshold value.

In an implementation of the disclosure, the first configuration information includes at least one of: RRC signaling, DCI, or an SIB.

In an implementation of the disclosure, the amount of PDSCHs is multiple. The multiple PDSCHs are transmitted by the network device on different time-domain resources. The multiple PDSCHs carry the same data.

In an implementation of the disclosure, the PUCCH resource is after time-domain resources of the multiple PDSCHs.

In an implementation of the disclosure, if NACK feedback information is transmitted on the PUCCH resource, the PUCCH resource is after time-domain resources of the multiple PDSCHs.

In an implementation of the disclosure, the first configuration information includes multiple DCIs, where each of the DCIs is used for scheduling one of the PDSCHs, and each of the DCIs is further used for determining a transmission resource of a PUCCH used for carrying ACK feedback information.

In an implementation of the disclosure, if one PDSCH is successfully received by the terminal device, the ACK feedback information is transmitted by the terminal device on a transmission resource of a PUCCH corresponding to the one PDSCH. If some of the multiple PDSCHs are successfully received by the terminal device, the ACK feedback information is transmitted by the terminal device on a transmission resource of a PUCCH corresponding to a PDSCH that is first successfully received.

It is to be noted that, for the specific implementation process of this embodiment, reference can be made to the specific implementation process of the foregoing method embodiment, which will not be elaborated again herein.

Figure 6:
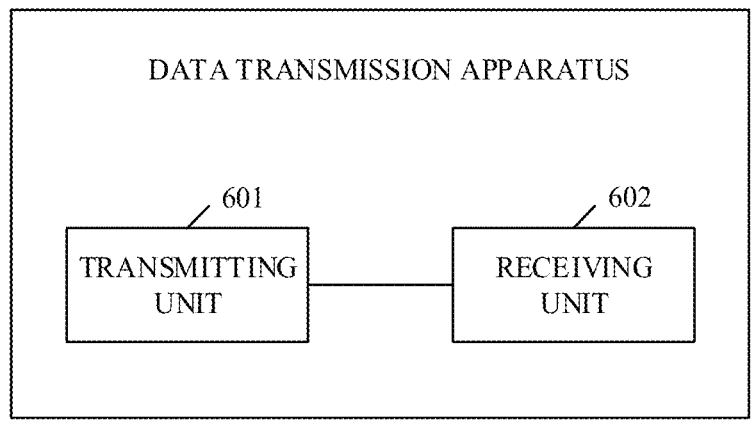
FIG. 6 illustrates a data transmission apparatus provided in implementations of the disclosure.

Refer to FIG. 6, which illustrates a data transmission apparatus provided in implementations of the disclosure. The apparatus is applicable to a network device. The apparatus includes a transmitting unit 601 and a receiving unit 602. The transmitting unit 601 is configured to transmit a PDSCH and transmit first configuration information, where the PDSCH is used for carrying a first-type service, and the first configuration information is used for configuring a PUCCH resource. The receiving unit 602 is configured to receive, on the PUCCH resource, uplink feedback information transmitted by a terminal device, where the uplink feedback information indicates whether a service carried by the PDSCH is correctly received.

In an implementation of the disclosure, the first-type service is transmitted in a multicast manner or a broadcast manner.

In an implementation of the disclosure, the first-type service is an MBMS.

In an implementation of the disclosure, the PUCCH resource includes one first PUCCH resource. The uplink feedback information includes NACK feedback information. Each terminal device that needs to transmit the NACK feedback information uses the one first PUCCH resource to transmit the NACK feedback information.

In an implementation of the disclosure, the PUCCH resource includes multiple second PUCCH resources. The uplink feedback information includes NACK feedback information. Each terminal device that needs to transmit the NACK feedback information uses one of the multiple second PUCCH resources to transmit the NACK feedback information.

In an implementation of the disclosure, the second PUCCH resource used by the terminal device to transmit the NACK feedback information is determined according to an RSRP measured by the terminal device.

In an implementation of the disclosure, the second PUCCH resource used by the terminal device to transmit the NACK feedback information is determined according to an identifier of the terminal device.

In an implementation of the disclosure, the identifier is an RNTI of the terminal device or a member identifier of the terminal device in a communication group.

In an implementation of the disclosure, the transmitting unit 601 is further configured to retransmit the PDSCH when a first amount of NACK feedback information received on the PUCCH resource is greater than or equal to a first threshold value.

In an implementation of the disclosure, the PUCCH resource includes one third PUCCH resource and one fourth PUCCH resource. The uplink feedback information includes NACK feedback information and an ACK feedback message. Each terminal device that needs to transmit the NACK feedback information uses the one third PUCCH resource to transmit the NACK feedback information, and each terminal device that needs to transmit the ACK feedback information uses the one fourth PUCCH resource to transmit the ACK feedback information.

In an implementation of the disclosure, the PUCCH resource includes multiple fifth PUCCH resources and multiple sixth PUCCH resources. Each terminal device that needs to transmit NACK feedback information uses one of the multiple fifth PUCCH resources to transmit the NACK feedback information, and each terminal device that needs to transmit ACK feedback information uses one of the multiple sixth PUCCH resources to transmit the ACK feedback information.

In an implementation of the disclosure, the fifth PUCCH resource used by the terminal device to transmit the NACK feedback information is determined according to an RSRP measured by the terminal device, and/or the sixth PUCCH resource used by the terminal device to transmit the ACK feedback information is determined according to an RSRP measured by the terminal device.

In an implementation of the disclosure, the fifth PUCCH resource used by the terminal device to transmit the NACK feedback information is determined according to an identifier of the terminal device, and/or the sixth PUCCH resource used by the terminal device to transmit the ACK feedback information is determined according to an identifier of the terminal device.

In an implementation of the disclosure, the transmitting unit 601 is further configured to retransmit the PDSCH when a second amount of NACK feedback information received on the PUCCH resource is greater than or equal to a second threshold value; or retransmit the PDSCH when a third amount of ACK feedback information received on the PUCCH resource is less than or equal to a third threshold value; or retransmit the PDSCH when a ratio of a fourth amount to a fifth amount is greater than or equal to a fourth threshold value, where the fourth amount is an amount of NACK feedback information received on the PUCCH resource, and the fifth amount is an amount of ACK feedback information received on the PUCCH resource.

In an implementation of the disclosure, the first amount, the second amount, the third amount, the fourth amount, or the fifth amount is determined according to an energy or power of the PUCCH resource measured by the network device.

In an implementation of the disclosure, the PUCCH resource includes one seventh PUCCH resource and multiple eighth PUCCH resources. The uplink feedback information includes NACK feedback information and an ACK feedback message. Each terminal device that needs to transmit the NACK feedback information uses the one seventh PUCCH resource to transmit the NACK feedback information. Each terminal device that needs to transmit the ACK feedback information uses one of the multiple eighth PUCCH resources, and different terminal devices use different eighth PUCCH resources.

In an implementation of the disclosure, frequency-domain resources, time-domain resources, or code-domain resources of different eighth PUCCH resources are different.

In an implementation of the disclosure, the PUCCH resource includes multiple ninth PUCCH resources and multiple tenth PUCCH resources. The uplink feedback information includes NACK feedback information and an ACK feedback message. Each terminal device that needs to transmit the NACK feedback information uses one of the multiple ninth PUCCH resources, and different terminal devices use different ninth PUCCH resources. Each terminal device that needs to transmit the ACK feedback information uses one of the multiple tenth PUCCH resources, and different terminal devices use different tenth PUCCH resources.

In an implementation of the disclosure, frequency-domain resources, time-domain resources, or code-domain resources of different ninth PUCCH resources are different. Frequency-domain resources, time-domain resources, or code-domain resources of different tenth PUCCH resources are different.

In an implementation of the disclosure, an information format of the NACK feedback information includes a first sequence. The first sequence is determined according to a cell-ID or determined according to the first configuration information.

In an implementation of the disclosure, a transmission format of the NACK feedback information includes PUCCH format 0.

In an implementation of the disclosure, the uplink feedback information is transmitted by the terminal device when a measured RSRP is greater than a fifth threshold value, or the uplink feedback information is transmitted by the terminal device when a measured RSRP is less than a sixth threshold value.

In an implementation of the disclosure, the first configuration information includes at least one of: RRC signaling, DCI, or an SIB.

In an implementation of the disclosure, the amount of PDSCHs is multiple. The multiple PDSCHs are transmitted by the network device on different time-domain resources. The multiple PDSCHs carry the same data.

In an implementation of the disclosure, the PUCCH resource is after time-domain resources of the multiple PDSCHs.

In an implementation of the disclosure, if NACK feedback information is transmitted on the PUCCH resource, the PUCCH resource is after time-domain resources of the multiple PDSCHs.

In an implementation of the disclosure, the first configuration information includes multiple DCIs, where each of the DCIs is used for scheduling one of the PDSCHs, and each of the DCIs is further used for determining a transmission resource of a PUCCH used for carrying ACK feedback information.

In an implementation of the disclosure, if one PDSCH is successfully received by the terminal device, the ACK feedback information is transmitted by the terminal device on a transmission resource of a PUCCH corresponding to the one PDSCH. If some of the multiple PDSCHs are successfully received by the terminal device, the ACK feedback information is transmitted by the terminal device on a transmission resource of a PUCCH corresponding to a PDSCH that is first successfully received.

It is to be noted that, the transmitting unit 601 and the receiving unit 602 may be implemented by a communication interface.

Figure 7:
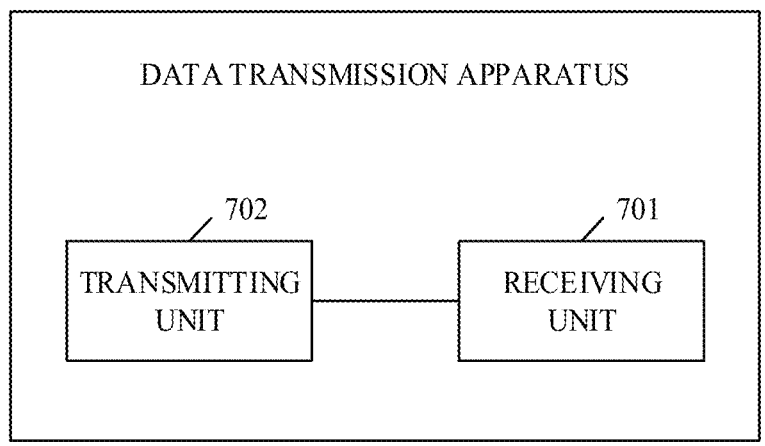
FIG. 7 illustrates a data transmission apparatus provided in implementations of the disclosure.

Refer to FIG. 7, which illustrates a data transmission apparatus provided in implementations of the disclosure. The apparatus is applicable to a terminal device. The apparatus includes a receiving unit 701 and a transmitting unit 702. The receiving unit 701 is configured to receive a PDSCH and first configuration information transmitted by a network device, where the PDSCH is used for carrying a first-type service, and the first configuration information is used for configuring a PUCCH resource. The transmitting unit 702 is configured to transmit uplink feedback information to the network device on the PUCCH resource, where the uplink feedback information indicates whether a service carried by the PDSCH is correctly received.

In an implementation of the disclosure, the first-type service is transmitted in a multicast manner or a broadcast manner.

In an implementation of the disclosure, the first-type service is an MBMS.

In an implementation of the disclosure, the PUCCH resource includes one first PUCCH resource. The uplink feedback information includes NACK feedback information. Each terminal device that needs to transmit the NACK feedback information uses the one first PUCCH resource to transmit the NACK feedback information.

In an implementation of the disclosure, the PUCCH resource includes multiple second PUCCH resources. The uplink feedback information includes NACK feedback information. Each terminal device that needs to transmit the NACK feedback information uses one of the multiple second PUCCH resources to transmit the NACK feedback information.

In an implementation of the disclosure, the second PUCCH resource used by the terminal device to transmit the NACK feedback information is determined according to an RSRP measured by the terminal device.

In an implementation of the disclosure, the second PUCCH resource used by the terminal device to transmit the NACK feedback information is determined according to an identifier of the terminal device.

In an implementation of the disclosure, the identifier is an RNTI of the terminal device or a member identifier of the terminal device in a communication group.

In an implementation of the disclosure, the receiving unit 701 is further configured to receive the PDSCH retransmitted by the network device, where the network device retransmits the PDSCH if a first amount of NACK feedback information received on the PUCCH resource is greater than or equal to a first threshold value.

In an implementation of the disclosure, the PUCCH resource includes one third PUCCH resource and one fourth PUCCH resource. The uplink feedback information includes NACK feedback information and an ACK feedback message. Each terminal device that needs to transmit the NACK feedback information uses the one third PUCCH resource to transmit the NACK feedback information, and each terminal device that needs to transmit the ACK feedback information uses the one fourth PUCCH resource to transmit the ACK feedback information.

In an implementation of the disclosure, the PUCCH resource includes multiple fifth PUCCH resources and multiple sixth PUCCH resources. Each terminal device that needs to transmit NACK feedback information uses one of the multiple fifth PUCCH resources to transmit the NACK feedback information, and each terminal device that needs to transmit ACK feedback information uses one of the multiple sixth PUCCH resources to transmit the ACK feedback information.

In an implementation of the disclosure, the fifth PUCCH resource used by the terminal device to transmit the NACK feedback information is determined according to an RSRP measured by the terminal device, and/or the sixth PUCCH resource used by the terminal device to transmit the ACK feedback information is determined according to an RSRP measured by the terminal device.

In an implementation of the disclosure, the fifth PUCCH resource used by the terminal device to transmit the NACK feedback information is determined according to an identifier of the terminal device, and/or the sixth PUCCH resource used by the terminal device to transmit the ACK feedback information is determined according to an identifier of the terminal device.

In an implementation of the disclosure, the receiving unit 701 is further configured to receive the PDSCH retransmitted by the network device, where the network device retransmits the PDSCH if a second amount of NACK feedback information received on the PUCCH resource is greater than or equal to a second threshold value; or the network device retransmits the PDSCH if a third amount of ACK feedback information received on the PUCCH resource is less than or equal to a third threshold value; or the network device retransmits the PDSCH if a ratio of a fourth amount to a fifth amount is greater than or equal to a fourth threshold value, where the fourth amount is an amount of NACK feedback information received on the PUCCH resource, and the fifth amount is an amount of ACK feedback information received on the PUCCH resource.

In an implementation of the disclosure, the first amount, the second amount, the third amount, the fourth amount, or the fifth amount is determined according to an energy or power of the PUCCH resource measured by the network device.

In an implementation of the disclosure, the PUCCH resource includes one seventh PUCCH resource and multiple eighth PUCCH resources. The uplink feedback information includes NACK feedback information and an ACK feedback message. Each terminal device that needs to transmit the NACK feedback information uses the one seventh PUCCH resource to transmit the NACK feedback information. Each terminal device that needs to transmit the ACK feedback information uses one of the multiple eighth PUCCH resources, and different terminal devices use different eighth PUCCH resources.

In an implementation of the disclosure, frequency-domain resources, time-domain resources, or code-domain resources of different eighth PUCCH resources are different.

In an implementation of the disclosure, the PUCCH resource includes multiple ninth PUCCH resources and multiple tenth PUCCH resources. The uplink feedback information includes NACK feedback information and an ACK feedback message. Each terminal device that needs to transmit the NACK feedback information uses one of the multiple ninth PUCCH resources, and different terminal devices use different ninth PUCCH resources. Each terminal device that needs to transmit the ACK feedback information uses one of the multiple tenth PUCCH resources, and different terminal devices use different tenth PUCCH resources.

In an implementation of the disclosure, frequency-domain resources, time-domain resources, or code-domain resources of different ninth PUCCH resources are different. Frequency-domain resources, time-domain resources, or code-domain resources of different tenth PUCCH resources are different.

In an implementation of the disclosure, an information format of the NACK feedback information includes a first sequence. The first sequence is determined according to a cell-ID or determined according to the first configuration information.

In an implementation of the disclosure, a transmission format of the NACK feedback information includes PUCCH format 0.

In an implementation of the disclosure, the uplink feedback information is transmitted by the terminal device when a measured RSRP is greater than a fifth threshold value, or the uplink feedback information is transmitted by the terminal device when a measured RSRP is less than a sixth threshold value.

In an implementation of the disclosure, the first configuration information includes at least one of: RRC signaling, DCI, or an SIB.

In an implementation of the disclosure, the amount of PDSCHs is multiple. The multiple PDSCHs are transmitted by the network device on different time-domain resources. The multiple PDSCHs carry the same data.

In an implementation of the disclosure, the PUCCH resource is after time-domain resources of the multiple PDSCHs.

In an implementation of the disclosure, if NACK feedback information is transmitted on the PUCCH resource, the PUCCH resource is after time-domain resources of the multiple PDSCHs.

In an implementation of the disclosure, the first configuration information includes multiple DCIs, where each of the DCIs is used for scheduling one of the PDSCHs, and each of the DCIs is further used for determining a transmission resource of a PUCCH used for carrying ACK feedback information.

In an implementation of the disclosure, if one PDSCH is successfully received by the terminal device, the ACK feedback information is transmitted by the terminal device on a transmission resource of a PUCCH corresponding to the one PDSCH. If some of the multiple PDSCHs are successfully received by the terminal device, the ACK feedback information is transmitted by the terminal device on a transmission resource of a PUCCH corresponding to a PDSCH that is first successfully received.

It is to be noted that, the receiving unit 701 and the transmitting unit 702 may be implemented by a communication interface.

Implementations of the disclosure further provide a computer storage medium. The computer storage medium is configured to store computer programs used for electronic data interchange (EDI) which are operable with a computer to perform some or all operations of any method described in the foregoing method implementations. The computer described above includes a terminal device or a network device.

Implementations of the disclosure further provide a computer program product. The computer program product includes a non-transitory computer readable storage medium configured to store computer programs. The computer programs is operable with a computer to perform some or all operations of any method described in the foregoing method implementations. The computer program product may be a software installation package. The computer described above includes a terminal device or a network device.

It is to be noted that, for the sake of simplicity, various method implementations above are described as a series of action combinations. However, it will be appreciated by those skilled in the art that the disclosure is not limited by the sequence of actions described. According to the disclosure, some steps may be performed in other orders or simultaneously. In addition, it will be appreciated by those skilled in the art that the implementations described in the specification are preferable implementations, and the actions and modules involved are not necessarily essential to the disclosure.

In the foregoing implementations, the description of each implementation has its own emphasis. For the parts not described in detail in one implementation, reference may be made to related descriptions in other implementations.

It will be appreciated that the apparatuses disclosed in implementations of the disclosure may also be implemented in various other manners. For example, the above apparatus implementations are merely illustrative, e.g., the division of units is only a division of logical functions, and other manners of division may also be available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device or unit, and may be electrical or otherwise.

Units illustrated as separated components may or may not be physically separated. Components displayed as units may or may not be physical units, and may reside at one location or may be distributed to multiple networked units. Some or all of the units may be selectively adopted according to practical needs to achieve desired objectives of the solutions of implementations.

In addition, various functional units described in various implementations of the disclosure may be integrated into one processing unit or may be present as a number of physically separated units, and two or more units may be integrated into one. The integrated unit may take the form of hardware or a software functional unit.

If the integrated unit is implemented as software functional units and sold or used as standalone products, it may be stored in a computer readable memory. Based on such an understanding, the essential technical solutions of the disclosure, or the portion that contributes to the prior art, or all or part of the technical solutions may be embodied as software products. The computer software products can be stored in a memory and may include multiple instructions that, when executed, can cause a computing device, e.g., a personal computer, a server, a network device, etc., to execute some or all operations of the methods described in various implementations of the disclosure. The above memory may include various kinds of media that can store program codes, such as a universal serial bus (USB) flash disk, a read-only memory (ROM), a random access memory (RAM), a mobile hard drive, a magnetic disk, an optical disk, etc.

Those of ordinary skill in the art can understand that all or some operations of various methods in the foregoing implementations can be implemented by instructing related hardware by a program. The program can be stored in a computer-readable memory. The memory can include a flash disk, a ROM, a RAM, a magnetic disk, an optical disk, etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A data transmission method, being applicable to a network device and comprising:
   transmitting a physical downlink shared channel (PDSCH), the PDSCH being used for carrying a first-type service;
   transmitting first configuration information, the first configuration information being used for configuring a physical uplink control channel (PUCCH) resource; and
   receiving, on the PUCCH resource, uplink feedback information transmitted by a terminal device, the uplink feedback information indicating whether a service carried by the PDSCH is correctly received;
   wherein the PUCCH resource comprises one first PUCCH resource, the uplink feedback information comprises negative acknowledgement (NACK) feedback information, and the terminal device belongs to a group of terminal devices, wherein all terminal devices in the group that need to transmit the NACK feedback information use the one first PUCCH resource to transmit the NACK feedback information, if a first amount of NACK feedback information received on the PUCCH resource is greater than or equal to a first threshold value, the PDSCH will be retransmitted;
   wherein first threshold value is determined according to the number of terminal devices.

2. The method of claim 1, wherein the first-type service is transmitted in a multicast manner or a broadcast manner.

3. The method of claim 1, wherein the first-type service is a broadcast multicast service.

4. The method of claim 1, wherein an information format of the NACK feedback information comprises a first sequence, and the first sequence is determined according to a cell-identity (ID).

5. The method of claim 1, wherein a transmission format of the NACK feedback information comprises PUCCH format 0.

6. The method of claim 1, wherein the first configuration information comprises: radio resource control (RRC) signaling.

7. A network device, comprising:
   a processor;
   a transceiver; and
   a memory storing computer programs executed by the processor to make the transceiver to perform the method of claim 1.

8. A data transmission method, being applicable to a terminal device and comprising:
   receiving a physical downlink shared channel (PDSCH), the PDSCH being used for carrying a first-type service; and
   receiving first configuration information transmitted by a network device, the first configuration information being used for configuring a physical uplink control channel (PUCCH) resource; and
   transmitting uplink feedback information to the network device on the PUCCH resource, the uplink feedback information indicating whether a service carried by the PDSCH is correctly received,
   wherein the PUCCH resource comprises one first PUCCH resource, the uplink feedback information comprises negative acknowledgement (NACK) feedback information, and the terminal device belongs to a group of terminal devices, wherein all terminal devices in the group that need to transmit the NACK feedback information use the one first PUCCH resource to transmit the NACK feedback information, if a first amount of NACK feedback information received on the PUCCH resource is greater than or equal to a first threshold value, the PDSCH will be retransmitted by the network device;

wherein first threshold value is determined according to the number of terminal devices.

9. The method of claim 8, wherein the first-type service is transmitted in a multicast manner or a broadcast manner.

10. The method of claim 8, wherein the first-type service is a broadcast multicast service.

11. The method of claim 8, wherein an information format of the NACK feedback information comprises a first sequence, and the first sequence is determined according to a cell-identity (ID).

12. The method of claim 8, wherein a transmission format of the NACK feedback information comprises PUCCH format 0.

13. The method of claim 8, wherein the first configuration information comprises: radio resource control (RRC) signaling.

14. A terminal device, comprising:
a processor;
a transceiver; and
a memory storing computer programs executed by the processor to make the transceiver to:
receive a physical downlink shared channel (PDSCH), the PDSCH being used for carrying a first-type service;
receive first configuration information transmitted by a network device, the first configuration information being used for configuring a physical uplink control channel (PUCCH) resource; and
transmit uplink feedback information to the network device on the PUCCH resource, the uplink feedback information indicating whether a service carried by the PDSCH is correctly received,
wherein the PUCCH resource comprises one first PUCCH resource, the uplink feedback information comprises negative acknowledgement (NACK) feedback information, and the terminal device belongs to a group of terminal devices, wherein all terminal devices in the group that need to transmit the NACK feedback information use the one first PUCCH resource to transmit the NACK feedback information, if a first amount of NACK feedback information received on the PUCCH resource is greater than or equal to a first threshold value, the PDSCH will be retransmitted by the network device;

wherein first threshold value is determined according to the number of terminal devices.

15. The terminal device of claim 14, wherein the first-type service is transmitted in a multicast manner or a broadcast manner.

16. The terminal device of claim 14, wherein the first-type service is a broadcast multicast service.

17. The terminal device of claim 14, wherein an information format of the NACK feedback information comprises a first sequence, and the first sequence is determined according to a cell-identity (ID).

* * * * *